United States Patent Office 3,565,813
Patented Feb. 23, 1971

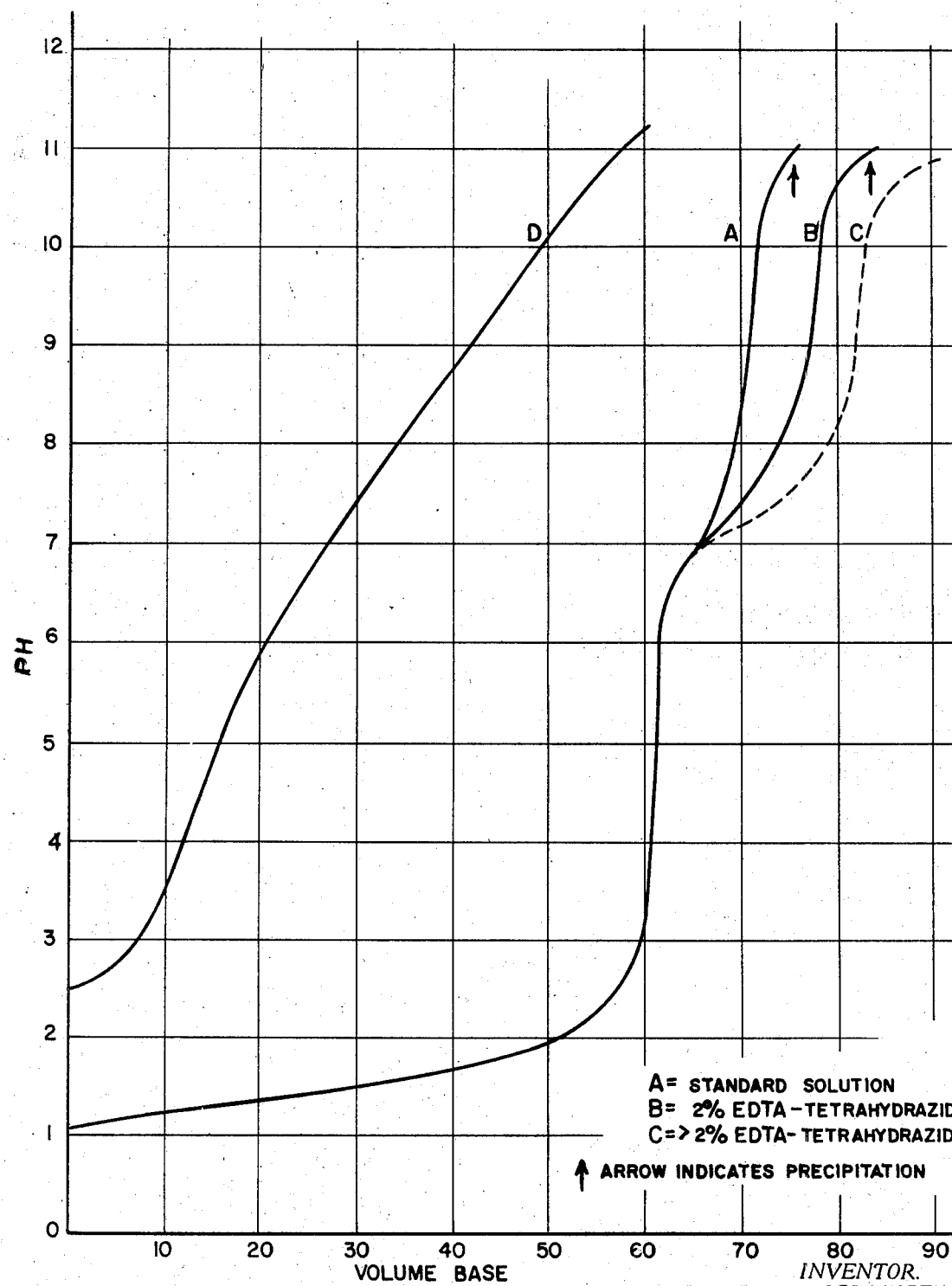

3,565,813
COMPOSITE CHELATING COMPOSITIONS
Frederick C. Bersworth, 120 Washington St.,
East Orange, N.J. 07017
Filed Oct. 2, 1967, Ser. No. 672,059
Int. Cl. C07c *101/24;* C09k *3/00*
U.S. Cl. 252—182
7 Claims

ABSTRACT OF THE DISCLOSURE

Chelating compositions of enhanced stability in use, namely, enhanced capacity and ability to hold a heavy metal in chelated form in solution at high pH are formed by using in combination pairs of ligand sources of ligand types, specifically, hydrazine reaction products of synthetic polyamino polycarboxylic acids together with the synthetic polyamino polycarboxylic acids and acid salts in a wide range of proportions.

DETAILED DESCRIPTION OF THE INVENTION

I have discovered that chelating compositions consisting essentially of a pair of components (1) a hydrazine reaction product of a polyamino polycarboxylic acid compositions having a formula answering to the following:

wherein

R is selected from the group consisting of H and

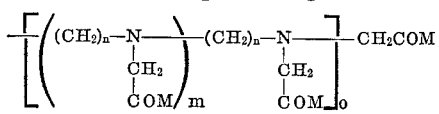

$m = 0\text{--}4$
$o = 0, 1$
$n = 2, 3$ and —COM is independently selected from the group consisting of COOH, —COONa, —COOK, —COONH$_4$, and C—O—O—Alkyl, not more than two COM's being —CH$_2$OH, with a compound selected from the group consisting of hydrazine, alkyl substituted hydrazines having 1–8 carbon atoms, guanidine, biguanidine, and urea, wherein at least one of said —COM's in acid form is reacted.

This amide reaction product of hydrazine and the polycarboxylic acid, in combination with a polyamino polycarboxylic acid chelating agent which is the acid or salt formed of the material reacted with the hydrazine in the first instance. The polyamino polycarboxylic acid compounds answer to the following formula:

wherein

R is selected from the group consisting of H and

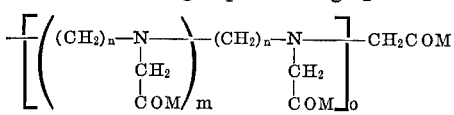

$m = 0\text{--}4$
$o = 0, 1$
$n = 2, 3$ and —COM is independently selected from the group consisting of COOH, —COONa, —COOK, —COONH$_4$, and C—O—O—Alkyl, not more than two COM's being —CH$_2$OH.

Generally, in making the compositions according to this invention most favorable results are obtained by combining in the composition the polyamino polycarboxylic acid which is used in the condensation product with the hydrazine and the polyamino polycarboxylic acid in about a 1:1 molar ratio, though broadly the range may be from 5%, by weight of either one with 95% by weight of the other. This appears to be a function of providing a large number of similar ligands of similar reactability so that the chelating function performed by one of the molecules is enhanced by the related chelating mechanism of the other.

In more quantitative terms, in investigating these compositions, the stability of these solutions was referred to measurements of the stability of the ion Fe(III)-EDTA and Fe(III) NTA solutions containing varying amounts of the hydrazides. To perform the measurements it was necessary to use a standard solution of the Fe(III)-ligand$_1$ where the ligand$_1$ is ethylene diamine tetraacetic acid, or nitrilotriacetic acid, so that controlled amounts of ligand$_2$, this would be a particular hydrazide, could be added which would allow comparisons of solutions with differing ligand$_2$ or of varying proportions of the ligand$_2$.

In the experimental work reported in the following examples the standard solutions contained five grams of ligand$_1$ and a stoichiometric amount of ferric nitrate. The solution thus was a 1:1 ratio of iron (Fe(III)) to the ligands. The solution was made in 50 milliliters of water.

On this basis the standard solution of the weight to weight ratio of ligand$_2$ to ligand$_1$ is the method by which the concentration of ligand$_2$ in solution is identified. For example, if 0.01 gram of EDTA-tetrahydrazide was added to the standard solution we would have $$\frac{0.01 \text{ gram ligand}_2}{0.500 \text{ gram ligand}_1} \times 100$$

or 2% EDTA-tetrahydrazide per total ligand in solution. (Strictly speaking the percentage is slightly less than 2 because the weight of total ligand in solution is 0.510 gram and not 0.500 gram, but this small deviation is neglected here.)

A better understanding of details of the composition will be obtained by reference to the drawing wherein the graphical representation of titration of standard solution with sodium hydroxide is represented as Curve A; Curve B is that obtained when 2% by weight of EDTA-tetrahydrazide is added to the standard solution titrated with the same standard base; C shows the shift in the second inflection of the titration curve when EDTA-tetrahydrazide concentration is again increased.

CURVE A (EXAMPLE I)

A standard solution of ligand$_1$ and ligand$_2$ alone titrated with 0.1123 molar sodium hydroxide.

CURVE B (EXAMPLE II)

A 2% by weight, 0.01 gram of ethylene diaminetetraaceticacidhydrazide was added to the standard solution and titrated with the same standard base.

CURVE C (EXAMPLE III)

The standard solution was titrated when the ethylene diamine tetraacetic acid tetrahydrazide condensation was increased to approximately 10 percent.

The experimental data involving the titration curve developed in Examples I, II and III are plotted herewith and in the drawing constitute the curves and are labeled Curves A, B and C.

The reactions induced involve mixed ligand complexes of Fe(III) using hydrazides and the chelating acids. The following theory outlines a mechanism for the phenomenon:

Schwarzenbach and Heller (Helv. Chim. Acta, 34, 576 (1951)) studied the interaction of OH⁻ on totally coordinated Fe(III)-EDTA:

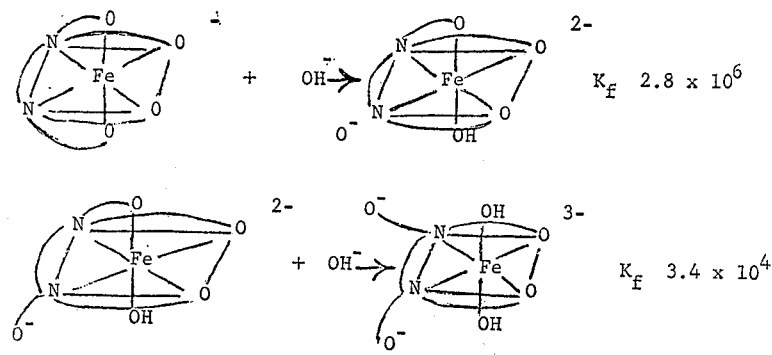

Apparently addition of the EDTA-tetrahydrazide inhibits the second reaction above, most likely through coordination of the hydrazide group.

Curve D in FIG. 1 is simply for reference, it represents the titration of 0.50 g. of EDTA-tetrahydrazide and 0.581 g. of Fe(NO$_3$)$_3$·9H$_2$O with 0.1123 M NaOH (a 1:1 mole ratio of the tetrahydrazide to Fe(III)). The EDTA-tetrahydrazide was used for this part of the study because it is of higher purity than the dihydrazides. The behavior of the EDTA-Fe(III) system with varying percentages of the tetrahydrazide at high pH values is presented in the following table.

TABLE I

| Percent tetrahydrazide | pH 11 | pH 11.4 |
|---|---|---|
| 2 | Orange-red ppt | Rust red precipitate. |
| 6 | Red turbidity | Do. |
| 10 | Dark red solution | Dark red solution.¹ |

¹ Ppt. only upon addition of a large amount of base.

The solution with 10% of the EDTA-tetrahydrazide present (0.05 g. EDTA-tetrahydrazide/0.5 g. of EDTA) can be boiled at pH 11 without appreciable decomposition. This behavior is not exhibited in a simple Fe(III)-EDTA system even if the EDTA is in great excess.

When Fe(III)-EDTA solutions are treated with disodium EDTA dihydrazide the results obtained are quite similar to those obtained with the tetrahydrazide. The titration curves are more difficult to interpret because we are now adding a salt of EDTA to the solution which can vastly change the early region of the titration curve as the percentage of the dihydrazide is increased. However, the assumption that the second hydroxy group is being inhibited from being attached directly to the Fe(III) ion can still be made due to the similarity of the complexing agent. Table II was compiled from data obtained by varying the percentage of disodium EDTA dihydrazide in the standard Fe(III)-EDTA solution.

TABLE II

| Percent dihydrazide | pH 11.0 | pH 11.4 |
|---|---|---|
| 2 | Orange-red solution | Rust-red precipitate. |
| 6 | Blood-red solution | Do. |
| 10 | do | Blood-red solution. |

HEAT STABILITY¹

| Percent dihydrazide | pH 9 | pH 10 | pH 11 |
|---|---|---|---|
| 2 | Orange-red solution | Yellow solution | Redish ppt. |
| 6 | do | do | Turbidity. |
| 10 | Red-orange solution | Orange solution | Orange solution. |

¹ Effect of boiling the solution at the given pH value.
² At slightly higher pH this solution may ppt. on standing.

Note that an Fe(III)-EDTA (1:1) solution can be stabilized to boiling at a rather high pH simply by addition of 7 to 10 weight percent of disodium EDTA dihydrazide.

Continuing with investigations in the Fe(III)-EDTA-ligand₂ systems the next substituent studied was the CaEDTA dihydrazide (pilot plant quality). As little as 2% of the CaEDTA dihydrazide will prevent precipitate from forming in an Fe(III)-EDTA solution at pH 11. Higher percentages are required to stabilize such a solution to boiling but this material seems adequate for lending stability to Fe(III)-EDTA systems.

If 10% sodium phosphate (monobasic) is added to a solution containing Fe(III)-EDTA in a 1:1 mole and 2% CaEDTA dihydrazide, the solution can be boiled at pH 10 without precipitate formation and at pH 11 the solution becomes only slightly cloudy with boiling.

Investigations were carried out in Fe(III)-nitrilotriaceticacid (NTA) systems, the results were not as good as with the Fe(III)-EDTA systems, but the solutions can be stabilized if the percentages of the hydrazides added are increased. With 30% of CaEDTA dihydrazide 20% NaH$_2$PO$_4$ added to the standard NTA-Fe(III) solution (0.5 gram NTA, 1.057 gram Fe(NO$_3$)$_3$·9H$_2$O) the solution can be brought to pH 11 without immediate precipitate formation, but upon standing the solution turns cloudy. The original NTA to Fe(III) ratio must be greater than 1:1 to allow stabilization of the solution by addition of a small percentage of hydrazide.

It will be apparent from these data that the addition of small amounts of EDTA hydrazides to Fe(III)-EDTA solutions stabilizes these solutions to high hydroxide ion concentrations as well as to heating at high pH. The proposed mechanism is the inhibition of OH⁻ by a stable Fe(III)-EDTA-hydrazide complex. Apparently it is the second entering OH⁻ which is prevented from entering the inner coordination sphere of Fe(III). It is known that once two OH⁻ groups are attached to Fe(III) olation polymers form resulting in subsequent precipitation.

It will be apparent from the quantitative results reported in connection with Curves A, B, C and D that the inclusion into a single composition of the fundamental ligand namely a compound like ethylenediaminetetraacetic acid or the polycarboxylic polyamino acetic acid compound together with a hydrazine reaction product of a compound of the family of chelating acids gives an enhancement of the heavy metal chelating ability of the composition, which, if it is explainable at all, is on the basis of a mechanism involving the plurality of ligand moieties in the solution with the surplus available to bind tightly with whatever metal is to be chelated. While ideally I have indicated that for quantitative results and study and survey of compositions it is perhaps best to relate hydrazine reaction products of acid A with Acid A in the composition to be used, there is no absolute requirement of this. That is, hydrazine reaction products of ethylene diamine tetraacetic acid may have as the second ligand in the mixture nitrilotriacetic acid. Hence from the following tabulation it is to be understood that any of the ligands numbered 1 may be mixed with any of the ligands numbered 2.

| Ligand$_1$ | Ligand$_2$ |
| --- | --- |
| (1) nitrilotriacetic acid | (1) mono-di and tri hydrazines of nitrilotriacetic acid. |
| (2) ethylene diamine tetraacetic acid. | (2) mono, di, tri and tetra-hydrazines of ethylene diamine tetraacetic acid. |
| (3) hydroxyethyl ethylene diamine triacetic acid. | (3) mono, di, tri and tetra hydrazines of hydroxyethyl ethylene diamine triacetic acid. |
| (4) di-ethylene tri-amine pent-acetic acid. | (4) mono, di, tri, tetra and penta hydrazine reaction products of diethylene triamine pentacetic acid. |

In general, for the preparation of these compositions it is perhaps most desirable to use the preformed hydrazide prepared in accordance with the procedure described in my United States patent application Ser. No. 580,829, filed Sept. 20, 1966, which issued on Nov. 7, 1967 as United States Pat. No. 3,351,658. Generally, the precaution to be observed in the preparation of the hydrazides is to induce a reaction which separates water of reaction between hydrazine and the acid form so as to develop a CONHNH$_2$ grouping in the composite molecule. In converting a polyamino polycarboxylic acid compound to this form it is generally simplest to work from an acid form, of the compound specifically a mono, di, tri or tetra acid form of the ethylene diamine tetraacetic acid compound. The presence of a neutralized group, or two, or three, in the molecule does no harm, but it does not lead to the formation of the amide group which is sought. In admixture then with the unmodified polyamino polycarboxylic acid the compounds place in the solution a large number of ligands which are reactive and reactable to combine with ions such as those of iron which require a large number of ligands to hold them chelated and, particularly, to hold them chelated at high alkaline pH values.

Hence the preparation of composition involves merely mixing a certain molar proportion of the hydrazide with a molar proportion of the ethylene diamine tetraacetic acid. Generally, it will be simplest to have then on a 1:1 molar ratio although it is perfectly reasonable to have a small but effective amount of the free chelating acid, as low as five percent of the weight of the hydrazide composition, to a range at the opposite extreme wherein the chelating composition will be largely the free ethylene diamine tetraacetic acid with as little as five percent by weight of the hydrazide. The preferred range of composition in the spectrum possible is in the range where there are approximately 1:1 molar ratios of the two compounds present and preferably it is a soluble acid form of the amino polycarboxylic acid mixed on a 1:1 molar ratio with the fully reacted hydrazide form thereof. I say a soluble acid form because at very low pH EDTA is not water solutble and its neutralization to Na$_1$ or Na$_2$ form is needed for solubilizing.

It will be apparent from an inspection of the formulas that where each of the acids can have a plurality of hydrazide and salt forms and each of the acids can also have a variety of salt forms that the mixtures of the hydrazides with the acids and the acid salt forms produces an extraordinarily large number of combinations. This however is reducible to the relatively simplified formula for the preparation of these synergistic compositions, which involves merely the 1 for 1 molar mixture of the two.

In the preparation, the physical mixing of the two compositions through careful blending and use thereafter is perfectly adequate.

The preferred acids to use, or any acid salt thereof, for the formation of the hydrazine reaction products to be mixed with the acids or acid salts are the following: iminodiacetic acid; hydroxyethylnitrilodiacetic acid; nitrilotriacetic acid; dihydroxyethylnitrilomonoacetic acid; ethylenediaminetetraacetic acid, diethyltriaminepentaacetic acid, triethylenetetraamine hexaacetic acid and, mono- and dihydroxyethyl variants thereof.

I claim:

1. A composition of a pair of components consisting essentially of a first component selected from a group of compounds consisting of the reaction product of a compound having a formula given by:

wherein

R is hydrogen or

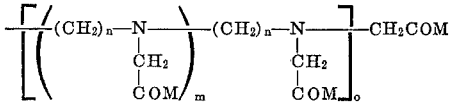

$m = 0$–$4$
$o = 0, 1$
$n = 2, 3$ and —COM is independently selected from the group consisting of COOH, —COONa, —COOK, —COONH$_4$, and C—O—O—Alkyl, not more than two COM's being —CH$_2$OH, with a compound selected from the group consisting of hydrazine, alkyl substituted hydrazines having 1–8 carbon atoms, guanidine, biguanidine, and urea, wherein at least one of said —COM's is reacted, said reaction being conducted under conditions wherein the reactants are freed of water, the conditions being such that water is liberated in the reaction, the reaction being conducted at a temperature sufficient to eliminate water of reaction with acid forms, and alcohol of reaction with ester forms, and a second component selected from a group of compounds consisting of

wherein

R is hydrogen or

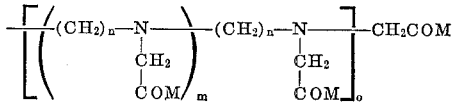

$m = 0$–$4$
$o = 0, 1$
$n = 2, 3$ and —COM is independently selected from the group consisting of COOH, —COONa, —COOK, —COONH$_4$, said first component being present in the range of 5 percent to 95 percent by weight, and the second component being present in the range of 95 percent to 5 percent, by weight.

2. A composition in accordance with claim 1 consisting essentially of (1) the amide product of reaction of one mole of ethylene diamine tetra acetic acid and two moles of hydrazine, and (2) ethylene diamine tetraacetic acid.

3. A composition in accordance with claim 1 consisting essentially of (1) the amide product of reaction of one mole of hydroxy ethyl ethylene diamine triacetic acid and one mole of hydrazine, and (2) hydroxy ethyl-ethylene-diamine triacetic acid.

4. A composition in accordance with claim 1 consisting essentially of (1) the amide product of reaction of one mole of hydroxy ethyl ethylene diamine triacetic acid and two moles of hydrazine, and (2) hydroxy ethyl ethylene diamine triacetic acid.

5. A composition in accordance with claim 1 consisting essentially of (1) the mono amide of hydrazine and ethylene diamine tetraacetic acid, and (2) ethylene diamine tetraacetic acid.

6. A composition in accordance with claim 1 consisting essentially of (1) the tri amide of hydrazine and ethylene diamine tetraaectic acid, and (2) ethylene diamine tetraacetic acid.

7. A composition in accordance with claim 1 consisting essentially of (1) the tetra amide of hydrazine and ethylene diamine tetraacetic acid, and (2) ethylene diamine tetraacetic acid.

References Cited

UNITED STATES PATENTS

| 2,396,938 | 3/1946 | Bersworth | 252—86X |
| 3,351,658 | 11/1967 | Bersworth | 260—534 |

FOREIGN PATENTS

| 963,556 | 7/1964 | Great Britain | 252—180 |

RICHARD D. LOVERING, Primary Examiner

I. GLUCK, Assistant Examiner

U.S. Cl. X.R.

23—190; 252—180